Apr. 10, 1923.
F. H. FLORING
1,451,148
CLUTCH PEDAL CONTROL FOR MOTOR VEHICLES
Filed Nov. 28, 1919     2 sheets-sheet 1
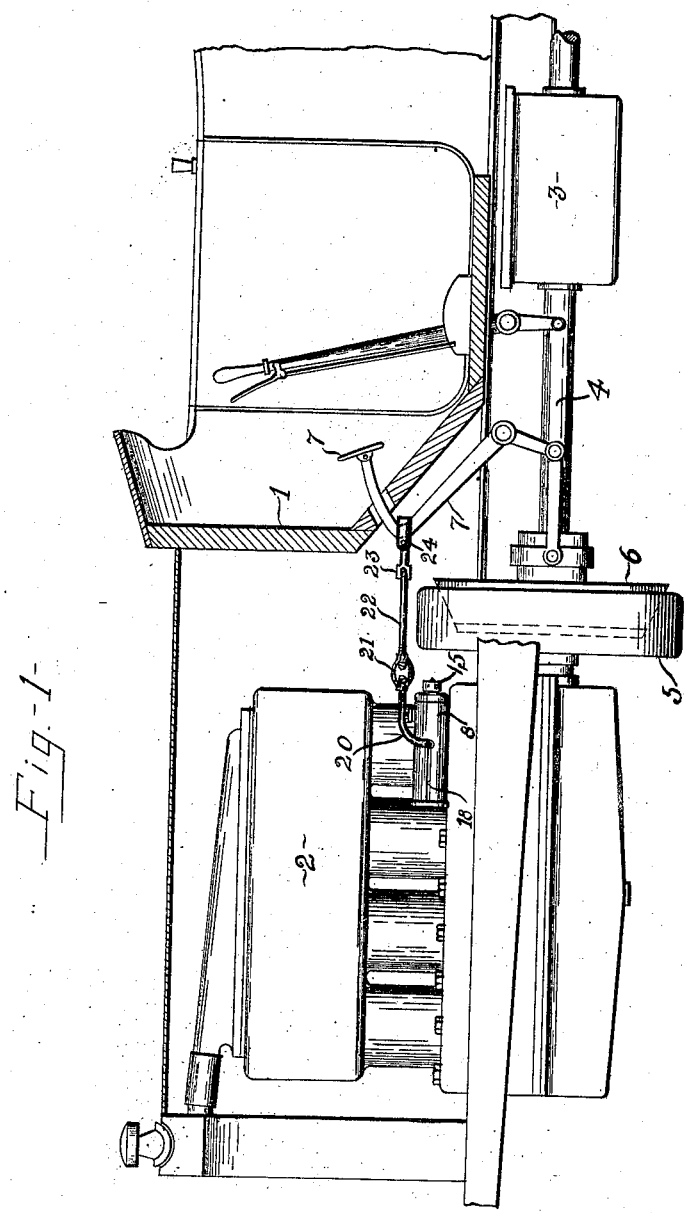
Fig-1-
INVENTOR.
Frank H. Floring
BY
Parsons & Bodell
ATTORNEYS.

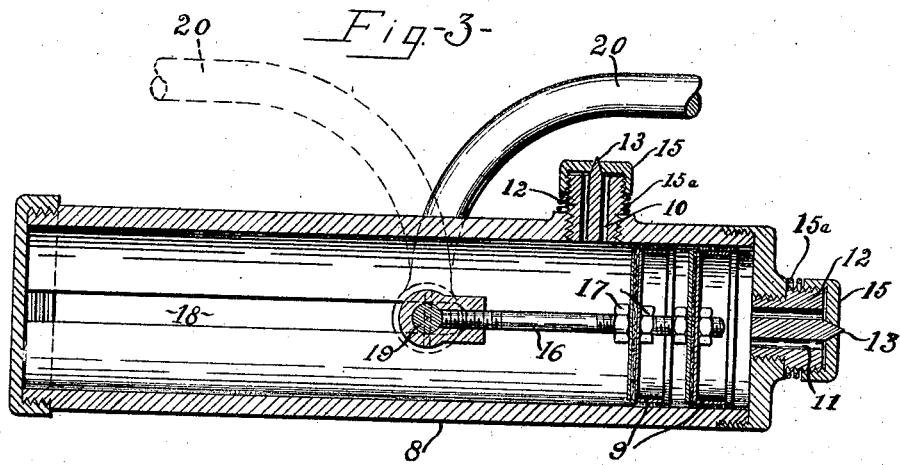
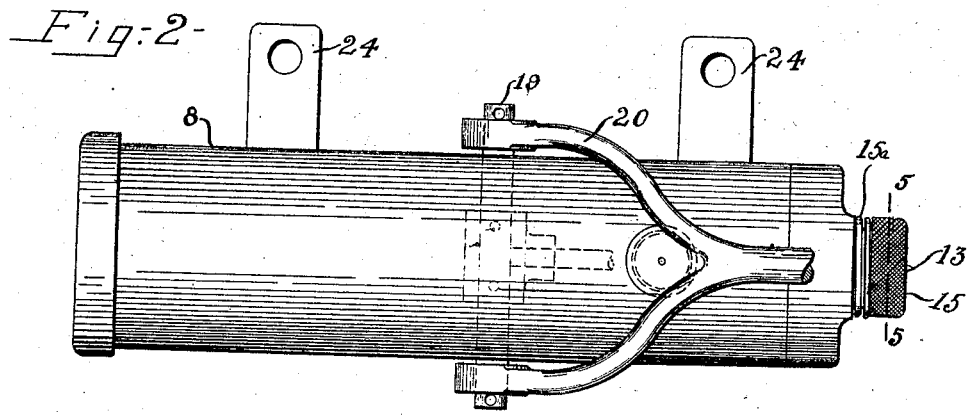
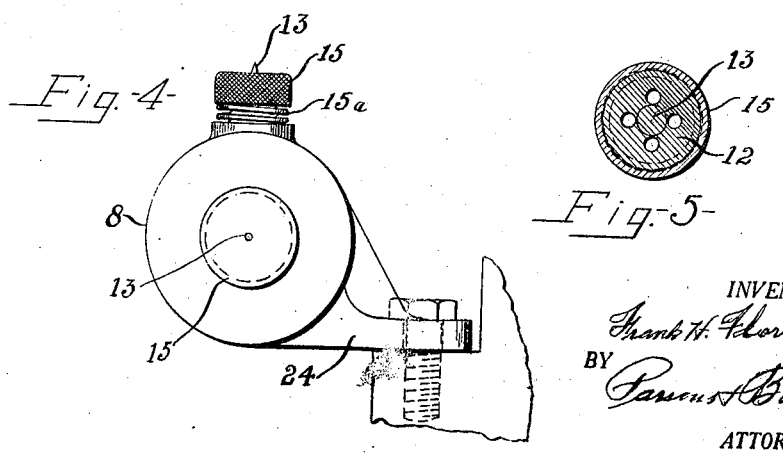

Patented Apr. 10, 1923.

1,451,148

UNITED STATES PATENT OFFICE.

FRANK H. FLORING, OF SYRACUSE, NEW YORK.

CLUTCH-PEDAL CONTROL FOR MOTOR VEHICLES.

Application filed November 28, 1919. Serial No. 341,139.

*To all whom it may concern:*

Be it known that I, FRANK H. FLORING, a citizen of the United States, residing at Syracuse, in the county of Onondaga and State of New York, have invented a certain new and useful Clutch-Pedal Control for Motor Vehicles, of which the following is a specification.

This invention has for its object a clutch pedal control for internal combustion engines, or motor vehicles in which the engines are installed, which control is particularly simple in construction, readily applied to the engine or vehicle and highly efficient and durable in use; and the invention consists in the novel features, and in the combinations and constructions hereinafter set forth and claimed.

In describing this invention, reference is had to the accompanying drawings, in which like characters designate corresponding parts in all the views.

Figure 1 is a fragmentary elevational view partly in section of a vehicle provided with my clutch pedal control.

Figure 2 is a plan view of the clutch pedal control.

Figure 3 is a longitudinal sectional view taken centrally of Figure 2.

Figure 4 is a rear end elevation of the pedal control showing the support fastening means.

Figure 5 is a sectional view taken on line 5—5, Figure 2.

1 designates the body of a motor vehicle; 2 the engine; 3 the gear case; 4 a shaft connecting the drive member of the clutch to the gear in the casing; 5 designates the clutch as a whole, which as here shown is of the cone type, in which the inner part 6 is held in engagement by a power member or by the clutch spring and is shifted out of engagement against the action of the spring by the clutch pedal 7.

As thus far described, the parts may be of any suitable form, size and construction and need be considered in connection with my invention only in so far as they relate to the clutch, which is shifted into engagement by a spring and out of engagement by the pedal.

The invention has for its object a self-contained device, readily attachable or adaptable to any vehicle to control or retard the engagement of the clutch by the powerful clutch spring so that the clutch cannot engage or take hold suddenly. The means for controlling or retarding the movement of the movable member of the clutch into engagement by this powerful spring, as here shown, comprises a cylinder 8 mountable in any suitable place on the engine or on the car body, a piston 9 movable in the cylinder, connections between the piston 9 and the clutch pedal 7 and means for controlling the flow out of the cylinder during movement of the piston in one direction when the piston is being moved by the clutch pedal, which in turn is being actuated by the clutch spring. The cylinder is formed with an air outlet port in its side and another air outlet port in its end, the former outlet in the side being arranged to be covered by the piston 9, when the piston is moving toward the end of the cylinder provided with the outlet 11. Thus, at the beginning of the movement of the piston under the influence of the powerful clutch spring, both ports 10 and 11 are open and after the clutch pedal has moved a predetermined distance, it is additionally checked by reason of the air port 10 having been passed by the piston so that all of the air must pass out through the port 11.

Means is provided for regulating the flow of air through the ports so that the device can be made standard to all clutches and regulated for the particular clutch to which it is applied, and as here shown, the ports 10 or 11 are provided in a plug 12 which threads into the cylinder, the ports being grouped in a circular series, and is formed with a centrally located pin having a conical point 13 extending beyond the outer end of the plug, so that the ports are spaced apart around the pin. A cap 15 screws on the plug 12 and is provided with a central conical opening through which the point 13 extends. By turning the cap 15 more or less onto the plug 12, the extent to which the opening in the cap is closed by the conical point 13 can be regulated. By turning the cap tightly against the point, the pedal can be locked against return movement. The cap is held against accidental turning by a spring 15$^a$. The piston 9, as here shown is double in construction, the two heads threading on the piston rod 16 and are held in position by nuts 17 arranged on opposite sides of the piston heads, these nuts being adjustable along the rod in order to position the piston heads in the proper position for the particular clutch to which the control is applied. The cylinder here shown, is provided with diametrically disposed lengthwise slots 18 formed in the end portion thereof not traversed by the piston heads 9 and the piston rod is supplied with a cross-head or bar 19, the ends of which extend through the slots 18.

The opposite ends of the cross-head are connected to the clutch pedal by a suitable link, which as here shown includes a yoke 20 connected to the ends of the bar and to a turn-buckle 21 which is also connected to the rod 22 connected by a universal joint 23 to a coupling 24 secured to the clutch pedal 7.

The cylinder is provided with suitable means by which it may be attached in any convenient place on the engine, or the vehicle body; it is here shown as provided with laterally extending feet or lugs 24 which may be secured as by screws to any suitable support, it being here shown as mounted upon the crank case of the engine and in front of the pedal 7, but in case it is mounted on the body in the rear of the pedal, the yoke 20 can be reversed as indicated in dotted lines in Figure 1.

Owing to the construction of the outlet ports the device can be standard to all vehicles and furthermore owing to the construction of the device, it is self-contained, can be attached to any part of the vehicle or power plant and hence is adaptable to any motor vehicle.

What I claim is:

A clutch pedal control for motor vehicles comprising a cylinder, a piston movable in the cylinder, means for fixedly securing the cylinder to a support, the piston being provided with a rod having a cross-head at its end remote from the piston, and the cylinder being formed with a guide for the cross-head, a link pivoted to the cross-head on opposite sides of the cylinder and connected to the clutch pedal of the motor vehicle and the cylinder being provided with a plurality of air outlets operating to increase the resistance of the air on the piston as the piston moves inwardly into the cylinder, substantially as and for the purpose described.

In testimony whereof, I have hereunto signed my name, at Syracuse, in the county of Onondaga, and State of New York, this 4 day of Nov., 1919.

FRANK H. FLORING.